United States Patent [19]

Ilardi et al.

[11] Patent Number: 4,498,706
[45] Date of Patent: Feb. 12, 1985

[54] SOLUTION MINING OF TRONA OR NAHCOLITE ORE WITH AQUEOUS NAOH AND HCL SOLVENTS

[75] Inventors: Joseph M. Ilardi, De Witt, N.Y.; David Goldstein, East Brunswick, N.J.

[73] Assignee: Intermountain Research & Development Corp., Green River, Wyo.

[21] Appl. No.: 523,486

[22] Filed: Aug. 15, 1983

[51] Int. Cl.³ ................... E21C 41/08; E21B 43/28
[52] U.S. Cl. ..................... 299/5; 423/206 T; 23/302 T
[58] Field of Search ............. 299/4, 5; 423/206 T, 423/191; 204/180 P; 23/302 T, 303

[56] References Cited

U.S. PATENT DOCUMENTS

| | | | |
|---|---|---|---|
| 3,184,287 | 5/1965 | Gancy | 423/206 T |
| 3,953,073 | 4/1976 | Kube | 299/5 |
| 4,219,396 | 8/1980 | Gancy et al. | 204/180 |
| 4,238,305 | 12/1980 | Gancy et al. | 204/180 |
| 4,391,680 | 7/1983 | Mani et al. | 204/98 |

Primary Examiner—Stephen J. Novosad
Assistant Examiner—Bruce M. Kisliuk
Attorney, Agent, or Firm—Christopher Egolf

[57] ABSTRACT

Separate deposits of trona or nahcolite ore are solution mined with two solvents, aqueous sodium hydroxide and aqueous hydrogen chloride. Aqueous sodium carbonate solution is withdrawn from the region of the NaOH-treated ore deposit, for recovery of soda ash. Aqueous sodium chloride brine is withdrawn from the region of the HCl-treated ore deposit and introduced to an electrodialysis cell to regenerate the two solvents and thereby continue the solution mining cycle.

13 Claims, 1 Drawing Figure

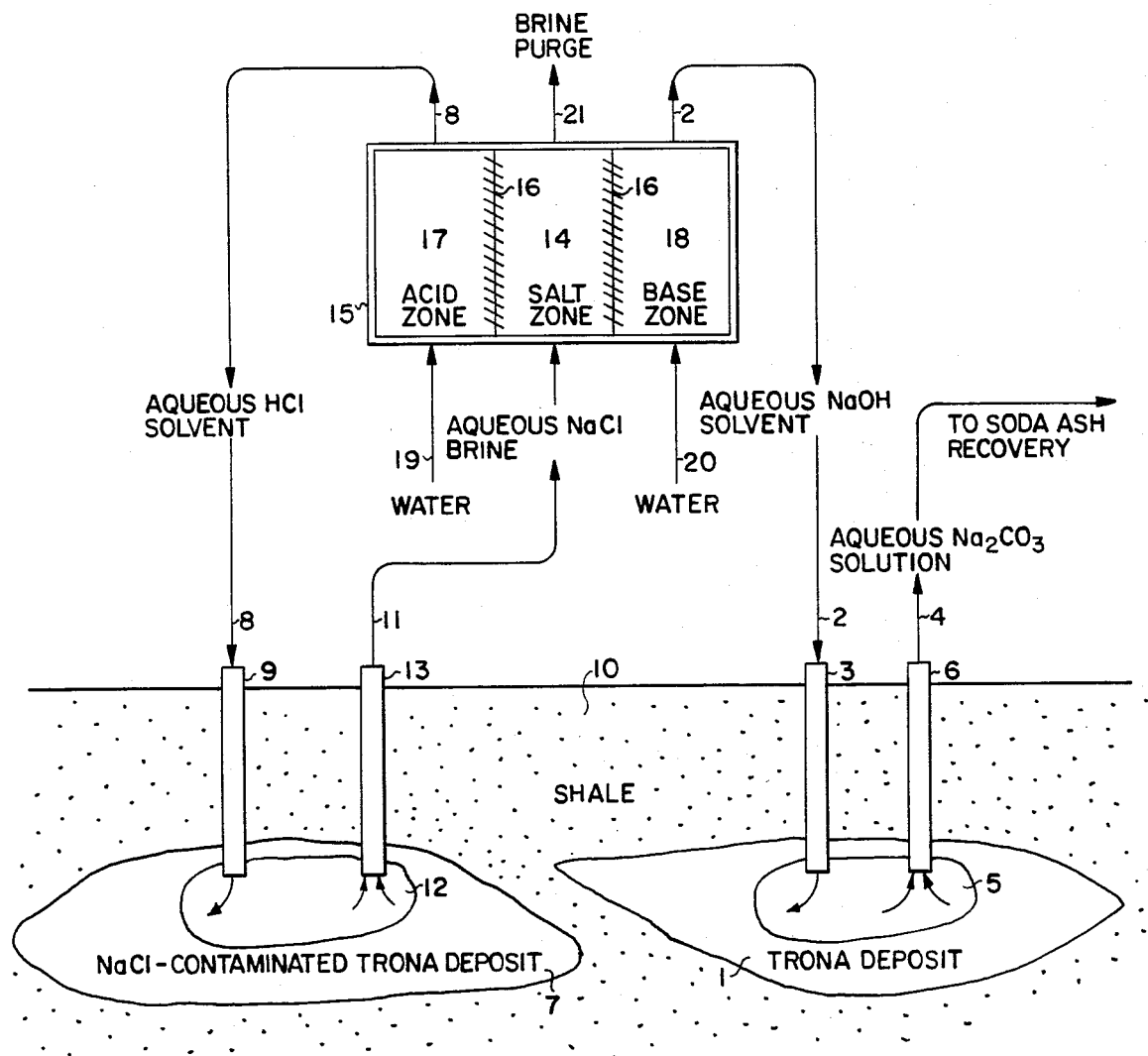

SOLUTION MINING OF TRONA OR NAHCOLITE ORE WITH AQUEOUS NAOH AND HCL SOLVENTS

BACKGROUND OF THE INVENTION

1. Field of the Invention

This invention relates to the solution mining of subterranean trona and/or nahcolite ore deposits with two solvents, aqueous sodium hydroxide and aqueous hydrogen chloride, that are generated electrodialytically.

2. Description of the Prior Art

The use of aqueous sodium hydroxide (NaOH) for solution mining of subterranean trona ore and nahcolite ore deposits is known. U.S. Pat. No. 3,184,287 issued to Gancy describes a cyclic process for solution mining trona with aqueous sodium hydroxide, this solvent being regenerated by causticization of aqueous sodium carbonate with lime. U.S. Pat. No. 3,953,073 issued to Kube describes the use of aqueous sodium hydroxide for solution mining of trona and nahcolite, and of other $NaHCO_3$-containing ores, and discloses that the solvent requirements may be met either by causticization of soda ash with hydrated lime or by the electrolytic conversion of sodium chloride to sodium hydroxide.

Aqueous sodium hydroxide that is produced by the electrolysis of aqueous sodium chloride brines also results in the coproduction of chlorine gas and hydrogen gas. Electrodialysis of such aqueous brines in a cell having permselective bipolar membranes, by contrast, allows aqueous sodium hydroxide to be produced without coproduction of chlorine and hydrogen.

U.S. Pat. No. 4,219,396 issued to Gancy et al. describes the operation of an electrodialysis cell in which soda ash is recovered using a brine feed. Aqueous sodium chloride is introduced as feed brine to salt zone of the electrodialysis cell, aqueous hydrogen chloride is removed from an acid zone, and NaOH-enriched aqueous sodium carbonate is withdrawn from a base zone and carbonated with $CO_2$.

U.S. Pat. No. 4,391,680 issued to Mani et al. describes the operation of a two-compartment electrodialysis cell in which an aqueous brine feed is introduced into the first compartment. An acidified salt solution, containing HCl, is withdrawn from the first compartment for use as feed to an electrolytic cell, and aqueous sodium hydroxide is withdrawn from the second compartment.

The method of the present invention relies on the electrolytic production of two solvents that are utilized in the solution mining of subterranean ore deposits of trona or nahcolite. The invention employs aqueous sodium hydroxide as the primary solution mining solvent, while nevertheless avoiding the unwanted byproducts (like chlorine) that typically result from electrolytic production of sodium hydroxide, as well as avoiding the environmental drawbacks associated with the regeneration of lime in lime causticization (for producing NaOH).

SUMMARY OF THE INVENTION

In accordance with the present invention, subterranean ore deposits of trona and/or nahcolite are solution mined in a cyclic method which involves contacting a first subterranean ore deposit with aqueous sodium hydroxide solvent to form an aqueous sodium carbonate solution and withdrawing aqueous sodium carbonate solution from the region of the first ore deposit, whereby soda ash may be recovered from the withdrawn sodium carbonate solution. The method further involves contacting a second subterranean ore deposit with aqueous hydrogen chloride solvent to form an aqueous sodium chloride brine and withdrawing the aqueous sodium chloride brine from the region of the second ore deposit. The withdrawn sodium chloride brine is introduced as feed solution into an electrodialysis cell and electrodialyzed to yield aqueous sodium hydroxide and aqueous hydrogen chloride. The aqueous sodium hydroxide and the aqueous hydrogen chloride are recycled to the first and second subterranean ore deposits, respectively, to repeat the solution mining recovery cycle.

The method of this invention is particularly suited for utilizing NaCl-contaminated trona or nahcolite deposits that are often located adjacent to more pure beds. The aqueous hydrogen chloride solvent, in such situations, is used to solution mine the NaCl-contaminated bed.

The aqueous sodium hydroxide solvent preferably contains 1-15 wt % NaOH. The aqueous hydrogen chloride solvent preferably contains from 1-15 wt % HCl.

The aqueous sodium carbonate solution withdrawn from the first ore deposit, which has been contacted with aqueous sodium hydroxide, is desirably introduced as feed solution into a monohydrate soda ash facility for recovery of its alkali values as dense soda ash.

The electrodialysis cell is preferably equipped with permselective bipolar membranes and contains an acid zone, a salt zone, and a base zone. Aqueous sodium chloride brine is fed to the salt zone, and aqueous hydrogen chloride and aqueous sodium hydroxide are withdrawn from the acid zone and base zone, respectively. Alternatively, the cell may contain only two zones, with aqueous brine being introduced to the first zone to yield an HCl-containing salt solution that is withdrawn from the first zone, and aqueous sodium hydroxide being withdrawn from the second zone.

BRIEF DESCRIPTION OF THE DRAWING

The drawing illustrates a preferred embodiment of the invention in which separate deposits of trona ore are solution mined and soda ash is recovered from the NaOH-treated ore deposit.

DETAILED DESCRIPTION

The subterranean deposits of $NaHCO_3$-containing ore that are treated in this invention may be trona (crude $Na_2CO_3.NaHCO_3.2H_2O$) or nahcolite (crude $NaHCO_3$) or combinations of the these ores. Trona is the preferred type of $NaHCO_3$-containing ore utilized in the method of this invention. The trona ore deposit may contain varying amounts of nahcolite without adverse effect on the solution mining method of the invention.

The first and second subterranean ore deposits, being treated with the aqueous sodium hydroxide (NaOH) and aqueous hydrogen chloride (HCl) solvents, respectively, must be physically separated. The mining solutions that result from the two respective solvents are different in composition and must be kept from intermingling or mixing to assure successful operation of the cyclic method of this invention.

The ore deposits may be separated vertically, by intervening layers of shale or other insoluble matter. This situation is preferred since it allows the solution mining wells to be sited in relatively close proximity, minimizing the surface transport of solutions.

Alternatively or in addition, the first and second ore deposits may be separated horizontally. A single large trona or nahcolite deposit could be simultaneously mined with the two solvents, by maintaining sufficient physical separation between the respective well systems to preclude the underground cavities from meeting or breaking through during the period of solution mining operation.

Multiple trona or nahcolite beds in a single region may be solution mined with either of the solvents. There is no requirement that mining be limited to a single bed or stratum of ore. It should therefore be understood that references to a first (or second) ore deposit include the option of simultaneously or concurrently mining several ore beds with the specified solvent.

The first ore deposit, solution mined with aqueous sodium hydroxide, is preferably low in impurities, particularly NaCl and $Na_2SO_4$.

The second ore deposit, solution mined with aqueous hydrogen chloride, may contain substantial amounts of sodium chloride as a contaminant. Low-NaCl and NaCl-contaminated trona or nahcolite beds are oftens located in close proximity, as strata separated by shale or other insoluble matter. This fact makes the two solvent solution mining method of this invention particularly well suited for the efficient recovery of available ore reserves in a single geographic region, despite salt contamination of some ore beds.

In the cyclic solution mining method of this invention, the aqueous sodium hydroxide solvent is contacted with the first ore deposit using conventional solution mining procedures. Such solution mining procedures are well-described in U.S. Pat. No. 3,184,287 issued to Gancy, which is hereby incorporated by reference. Its procedures are applicable not only to solution mining of trona but also of nahcolite.

The aqueous sodium hydroxide solvent preferably contains from 1-15 wt % NaOH and more preferably from 3-10 wt % NaOH.

The aqueous sodium carbonate solution that is withdrawn from the region of the first ore deposit is utilized for its alkali value. This solution typically contains from 15-30 wt % $Na_2CO_3$ and desirably is substantially free of sodium chloride and sodium sulfate, i.e., containing less than 1 wt % NaCl and 1 wt % $Na_2SO_4$.

The withdrawn sodium carbonate solution is preferably processed to recover soda ash. The procedures described in the previously-mentioned Gancy '287 patent may be employed to recover soda ash from such solution, as anhydrous sodium carbonate or sodium carbonate monohydrate.

The aqueous hydrogen chloride solvent is utilized to solution mine the second ore deposit using procedures analogous to those employed with the aqueous sodium hydroxide solvent. The aqueous hydrogen chloride solvent preferably contains from 1-15 wt % HCl and more preferably from 5-10 wt % HCl.

The aqueous hydrogen chloride solvent is highly reactive with the soluble portion of trona or nahcolite ore. The hydrogen chloride reacts rapidly and completely with sodium bicarbonate portion of the trona or nahcolite ore to yield sodium chloride and carbon dioxide. Since this reaction results in an aqueous sodium chloride brine, the aqueous hydrogen chloride solvent is clearly well suited for solution mining of trona or nahcolite deposits that are contaminated with sodium chloride.

The aqueous sodium chloride solution that is withdrawn from the region of the subterranean ore deposit is a salt brine that typically contains from 10-30 wt % NaCl. The aqueous sodium chloride brine may also contain sodium carbonate. The carbon dioxide that results from reaction of the hydrogen chloride with sodium bicarbonate portion of the ore is in large part dissolved in the mining solution at the subterranean deposit ground pressures.

When the withdrawn brine solution is exposed to atmospheric pressure on the surface, the carbon dioxide contained in such solution may be vented by mechanically degassing the solution. In a preferred embodiment of the invention, this released carbon dioxide may be recovered, as relatively pure $CO_2$. In addition, the energy contained in such gas may be recovered by channeling the gas through a turbine generator during degassing of the withdrawn brine solution.

The aqueous sodium chloride solution that is withdrawn from the second ore deposit, being mined with the aqueous hydrogen chloride, is employed as feed solution to an electrodialysis cell. Sodium carbonate which may also be present in the aqueous brine is desirably reacted with hydrogen chloride prior to the brine's introduction to the electrodialysis cell. The aqueous sodium chloride brine is preferably maintained at an acidic pH value, which minimizes the likelihood of solids precipitation in the cell compartments.

One type of electrodialysis cell that may be employed in this invention contains an acid zone, a salt zone, and a base zone, separated by permselective membranes. The aqueous sodium chloride brine is introduced to the salt zone, also called a compartment, of the electrodialysis cell. The brine feed solution is electrodialyzed into aqueous hydrogen chloride, which is removed from the acid zone, and aqueous sodium hydroxide, which is removed from the base zone of the cell. A single electrodialysis cell, it should be noted, may contain multiple units of these three zones.

A second type of electrodialysis cell suitable for use in the method of this invention contains two zones, separated by permselective membranes. Aqueous sodium chloride brine is introduced into the first zone, and salt solution acidified with hydrogen chloride is withdrawn from the same zone. Aqueous sodium hydroxide is withdrawn from the second zone.

The electrodialysis cell operations described in U.S. Pat. No. 4,219,396 issued to Gancy and in U.S. Pat. No. 4,391,680 issued to Mani et al. are similar in several respects to the electrodialysis procedures utilized in this invention. For this reason, U.S. Pat. Nos. 4,219,396 and 4,391,680 are hereby incorporated by reference.

In the Gancy '396 electrodialysis operation, aqueous hydrogen chloride is withdrawn from the acid zone of the three-zone cell. The subsequent neutralization of hydrogen chloride with lime or limestone to produce calcium chloride, as described by Gancy, is dispensed with in the present invention. The aqueous stream from the electrodialysis cell, containing about 8-10 wt % HCl, is used directly as aqueous mining solvent in the solution mining process of this invention.

Solution introduced to the acid zone is typically water, but may also be recycled HCl solution to which the necessary make-up water is added.

The other mining solvent in the present invention is aqueous sodium hydroxide, and consequently the cell operation described by Gancy is simplified to remove only aqueous NaOH from the base zone. This is accomplished by *not* carbonating the NaOH-enriched stream removed from the base zone (because the carbonation specified by Gancy has the effect of neutralizing the NaOH-content of the effluent stream).

The aqueous base zone effluent, typically containing 5–10 wt % NaOH, is utilized directly as the aqueous NaOH-containing solvent for solution mining in this invention. As with the hydrogen chloride concentration, however, the aqueous NaOH concentration may be varied beyond these limits by adjustment of cell operating parameters. Solution introduced to the base zone may be either water, or aqueous sodium hydroxide or aqueous sodium carbonate, to which the necessary make-up water is added.

In other major respects, operation of the Gancy electrodialysis cell is comparable to cell operation in the context of the present invention. Feed solution to the salt zone, for example, is aqueous sodium chloride solution. Such brine preferably contains from 15 wt % NaCl up to a saturation concentration.

The second electrodialysis patent incorporated by reference, U.S. Pat. No. 4,391,680 issued to Mani et al., describes a cell structure and operation that are simplified as compared with Gancy '396. Mani et al. call for use of a two-zone cell in which aqueous sodium chloride brine is introduced into the same compartment from which the HCl-containing product stream is withdrawn. The product stream is an aqueous sodium chloride solution that has been acidified through the electrodialytic generation of hydrogen chloride.

In the solution mining method of this invention, the aqueous hydrogen chloride solvent may also contain sodium chloride since this is what results from reaction of the solvent with trona and/or nahcolite. One difference in the procedure described by Mani et al., when adapted to this invention, is that higher HCl concentrations of about 5–10 wt % HCl are preferred in the effluent stream withdrawn from the electrodialysis cell for its use as aqueous HCl solvent. Examples of the two-zone cell operation described by Mani et al. show hydrogen chloride concentrations of about 2 wt % maximum, but it is disclosed that higher HCl concentrations may be obtained if desired.

The second zone in the Mani et al. electrodialysis cell yields concentrated sodium hydroxide, and this zone is preferably fed with water to maintain a constant NaOH concentration in the withdrawn alkaline stream. This effluent stream is directly usable as aqueous NaOH solvent for solution mining.

In other significant respects, the electrodialysis cell operation described by Mani et al is readily adapted to the two-solvent solution mining method of this invention.

EXAMPLE

As shown schematically in the drawing, a first deposit 1 of trona ore is contacted with an aqueous sodium hydroxide solvent 2, containing 7 wt % NaOH, that is introduced at a temperature of 25°–30° C. to the region of the subterranean ore deposit through an injection well 3. Solution 4 that is withdrawn from the ore cavity 5 through a withdrawal well 6 contains about 25 wt % $Na_2CO_3$.

The withdrawn aqueous sodium carbonate solution 4 is introduced (not shown in drawing) as feed solution to a "monohydrate" soda ash process. The solution is combined with carbonate solution overflowing from the dissolver in the soda ash process. The combined flowstream is directed to the thickener/clarifier operation in the "monohydrate" process. The clarifier overflow is introduced as feed solution to evaporative crystallizer circuit that yields sodium carbonate monohydrate. The separated monohydrate crystals are dried to recover an anhydrous soda ash.

Using solution mining procedures analogous to those for the aqueous NaOH solvent, a second deposit 7 of trona ore, containing 3–10 wt % NaCl, is contacted with an aqueous hydrogen chloride solvent 8 containing 9 wt % HCl, at a temperature of 25°–30° C., via an injection well 9. The second trona ore deposit 7 is physically separated from the first ore deposit by intervening layers of solvent-insoluble shale 10, so that neither cavity becomes interconnected with the other during their solution mining. The aqueous solvent 8 reacts with the sodium bicarbonate portion of the trona (sodium sesquicarbonate) in the subterranean ore deposit 7 and forms an aqueous sodium chloride brine, containing about 25 wt % NaCl. This salt brine also contains sodium chloride that dissolves directly from the NaCl-contaminated trona deposit 7.

The aqueous salt brine 11 is withdrawn from the cavity 12 via withdrawal well 13 and fed to the salt zone 14, or compartment, of an electrodialysis cell 15 fitted with permselective polar membranes 16. Effluent 8 from the acid zone 17 is aqueous hydrogen chloride containing 9 wt % HCl. This is used as mining solvent 8, by its recycle to the second trona deposit 7.

Effluent 2 from the base zone 18 of the electrodialysis cell 15 is aqueous sodium hydroxide, containing 7 wt % NaOH, and this is recycled as mining solvent 2 to the first trona deposit 1.

Water 19, 20 is introduced to the acid and base zones 17, 18, respectively, as needed to assure the proper concentration and flow rates of aqueous HCl solvent 8 and NaOH solvent 2. A portion of the aqueous HCl effluent 8 from the acid zone 17 may be recycled (not shown on drawing) and combined with make-up water 19; similarly, a portion of the aqueous NaOH effluent 2 may be recycled (not shown on drawing) to the base zone 18 and combined with make-up water 20. Effluent 21 from the salt zone 14 is a brine purge which is sufficient to maintain the level of impurities in the salt zone at an acceptable level.

The cyclic recovery procedure is operated continuously and yields soda ash as the recovered product. No unwanted by-products are produced or discarded, since virtually all of the sodium chloride is utilized, as is the hydrogen chloride from electrodialysis, to ultimately produce more soda ash.

We claim:

1. A cyclic method for solution mining subterranean ore deposits of trona or nahcolite which comprises
   (i) contacting a first subterranean trona or nahcolite ore deposit with aqueous sodium hydroxide solvent to form an aqueous sodium carbonate solution;
   (ii) withdrawing aqueous sodium carbonate solution from the region of the first ore deposit, whereby soda ash may be recovered from the withdrawn sodium carbonate solution;
   (iii) contacting a second subterranean trona or nahcolite ore deposit with aqueous hydrogen chloride solvent to form an aqueous sodium chloride brine;
   (iv) withdrawing the aqueous sodium chloride brine from the region of the second ore deposit;

(v) introducing the withdrawn sodium chloride brine as feed solution into an electrodialysis cell and electrodialyzing the brine to yield aqueous sodium hydroxide and aqueous hydrogen chloride; and (vi) recycling the aqueous sodium hydroxide and the aqueous hydrogen chloride to the first and second subterranean ore deposit, respectively, to repeat the solution mining recovery cycle.

2. A cyclic method for solution mining subterranean trona ore deposits which comprises (i) contacting a first subterranean trona ore deposit with aqueous sodium hydroxide solvent to form an aqueous sodium carbonate solution;

(ii) withdrawing aqueous sodium carbonate solution from the region of the first ore deposit, whereby soda ash may be recovered from the withdrawn sodium carbonate solution;

(iii) contacting a second subterranean trona ore deposit with aqueous hydrogen chloride solvent to form an aqueous sodium chloride brine;

(iv) withdrawing the aqueous sodium chloride brine from the region of the second ore deposit;

(v) introducing the withdrawn sodium chloride brine as feed solution into an electrodialysis cell and electrodialyzing the brine to yield aqueous sodium hydroxide and aqueous hydrogen chloride; and (vi) recycling the aqueous sodium hydroxide and the aqueous hydrogen chloride to the first and second subterranean trona ore deposits, respectively, to repeat the solution mining recovery cycle.

3. The method of claim 1 or 2 wherein the subterranean trona ore deposit also contains nahcolite.

4. The method of claim 1 or 2 wherein the subterranean trona ore deposit being solution-mined with aqueous hydrogen chloride is contaminated with sodium chloride.

5. The method of claim 1 or 2 wherein the aqueous sodium hydroxide solvent contains from 1-15 wt. % NaOH.

6. The method of claim 1 or 2 wherein the aqueous sodium hydroxide solvent contains from 3-10 wt. % NaOH.

7. The method of claim 1 or 2 wherein the aqueous hydrogen chloride solvent contains from 1-15 wt. % HCl.

8. The method of claim 1 or 2 wherein the aqueous hydrogen chloride solvent contains from 5-10 wt. % HCl.

9. The method of claim 1 or 2 wherein the withdrawn aqueous sodium carbonate solution is introduced as feed solution into a monohydrate soda ash facility.

10. The method of claim 1 or 2 wherein the electrodialysis cell is equipped with permselective bipolar membranes and contains an acid zone, a salt zone and a base zone.

11. The method of claim 10 wherein aqueous hydrogen chloride is withdrawn from the acid zone, aqueous sodium hydroxide is withdrawn from the base zone, and aqueous sodium chloride brine is introduced to the salt zone.

12. The method of claim 1 or 2 wherein the electrodialysis cell is equipped with permselective bipolar membranes and contains two zones.

13. The method of claim 12 wherein aqueous sodium chloride brine is introduced as feed to the first zone, aqueous hydrogen chloride also containing sodium chloride is withdrawn from the first zone, and aqueous sodium hydroxide is withdrawn from the second zone.

* * * * *